(12) United States Patent
Wang et al.

(10) Patent No.: US 8,134,638 B2
(45) Date of Patent: Mar. 13, 2012

(54) DISPLAY WITH ROTATABLE IMAGE CAPTURING MODULE

(75) Inventors: Shun-Lung Wang, Taipei (TW); Yi-Chuan Lee, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 1471 days.

(21) Appl. No.: 11/322,346

(22) Filed: Jan. 3, 2006

(65) Prior Publication Data

US 2006/0152614 A1   Jul. 13, 2006

(30) Foreign Application Priority Data

Jan. 7, 2005   (TW) ................................ 94100562 A

(51) Int. Cl.
*H04N 5/225* (2006.01)
*G03B 17/02* (2006.01)
(52) U.S. Cl. ..................... 348/373; 348/375; 396/535
(58) Field of Classification Search .................. 348/375, 348/373, 333
See application file for complete search history.

(56) References Cited

U.S. PATENT DOCUMENTS

| | | | | |
|---|---|---|---|---|
| 7,019,784 B1 * | 3/2006 | Shibuya et al. | ............... | 348/373 |
| 7,292,282 B2 * | 11/2007 | Chan et al. | .................... | 348/374 |
| 2001/0019946 A1 * | 9/2001 | Okuda | ............................ | 455/90 |
| 2004/0017479 A1 * | 1/2004 | Nakakubo et al. | ........ | 348/207.99 |
| 2004/0107537 A1 * | 6/2004 | Ahn et al. | ........................ | 16/221 |
| 2004/0145865 A1 * | 7/2004 | Lin | ................................ | 361/683 |
| 2005/0047773 A1 * | 3/2005 | Satake et al. | .................. | 396/301 |
| 2005/0073155 A1 * | 4/2005 | Weng | ............................. | 292/138 |
| 2005/0138772 A1 * | 6/2005 | Park | ................................ | 16/330 |
| 2005/0225667 A1 * | 10/2005 | Yamakose | ..................... | 348/373 |
| 2005/0263600 A1 * | 12/2005 | Yang et al. | ............... | 235/472.01 |

FOREIGN PATENT DOCUMENTS

| | | |
|---|---|---|
| CN | 1349145 A | 5/2002 |
| JP | 10-51665 | 2/1998 |
| JP | 2000-20163 | 1/2000 |
| JP | 2002-372036 | 12/2002 |
| JP | 2003-60764 | 2/2003 |
| JP | 2004-221775 | 8/2004 |
| JP | 2004-260688 | 9/2004 |

\* cited by examiner

*Primary Examiner* — Hung Lam

(57) ABSTRACT

A display including a first housing, a display panel and an image capturing module is provided. The first housing has a first surface and a second surface opposite to the first surface. The display panel is disposed on the first surface. The image capturing module includes a second housing and an image capturing unit. The second housing is mounted on the first housing. The second housing has an opening, which passes through the first surface and the second surface. The two ends of the image capturing unit are respectively pivotally connected to the innerwall of the opening so that the image capturing module is rotatably disposed on the display.

21 Claims, 7 Drawing Sheets

DISPLAY WITH ROTATABLE IMAGE CAPTURING MODULE

This application claims the benefit of Taiwan Application Serial No. 094100562, filed Jan. 7, 2005, the subject matter of which is incorporated herein by reference.

BACKGROUND OF THE INVENTION

1. Field of the Invention

The invention relates to a display, and more particularly to a display with rotatable image capturing module.

2. Description of the Related Art

Along with the booming of portable electronic products, 3G broadband communication and home appliances, and further accompanied by the versatile application of multi-media products such as dynamic video capturing and on-line video, a gorgeous market potential is expected.

Referring to FIG. 1A, a perspective diagram of a conventional portable computer with a lens module when unfolded is shown. Conventional portable computer 10 at least includes a body 11, an upper cover 12, a display panel 13 and a lens module 20. The upper cover 12 is pivotally connected to the body 11, and the display panel 13 is disposed on the upper cover 12. The lens module 20 includes a housing 21 and a lens (CMOS camera) 22. The lens module 20 is rotatably disposed on the upper cover 12 and positioned at the top of the display panel 13. When in use, the lens 22 is rotatable to adjust a suitable angle of capturing the desired image. When not in use, the lens 22 rotates to be coplanar with the display panel 13 to protect the lens 20 as shown in FIG. 1A. With the lens module being in-built in the portable computer, the portable computer can be more light, handy and convenientle. For example, the voice and images are transmitted and communicated in a video conference everywhere.

However, the lens module of a conventional portable computer is disposed on the edge of the upper cover and is susceptible to be collided and damaged. Referring to FIG. 1B, a front view of the portable computer of FIG. 1A when folded is shown. When the user opens or closes the upper cover 12, the lens module 20 is very likely to be touched or collided, and results in unnecessary tipping over. When the user holds one end of the upper cover 12 and opens the upper cover 12, the lens module 20 is still very likely to be touched and tipped over. Similarly, no matter the upper cover 12 is being opened or closed, the user may carelessly touch or turn the lens module 20. Consequently, the lens module 20 will become loose or out of order, reducing the lifespan of the mechanic components in the lens module 20.

SUMMARY OF THE INVENTION

It is therefore the object of the invention to provide a display whose image capturing module has a protection housing to prevent the module from being damaged due to tipping over or collision.

According to an embodiment of the invention, a display is provided. The image capturing module of the display adopts a two-stage rotary design, enabling the image capturing module to be fixed at several predetermined angles and positions for the user's convenience of use.

According to another embodiment of the invention, a display including a first housing, a display panel and an image capturing module is provided. The first housing has a first surface and a second surface opposite to the first surface. The display panel is disposed on the first surface. The image capturing module includes a second housing and an image capturing unit. The second housing is mounted on the first housing. The second housing has an opening, which passes through the first surface and the second surface. The two ends of the image capturing unit are respectively pivotally connected to the innerwall of the opening so that the image capturing module is rotatably disposed on the second housing.

According to yet another object of the invention, a display including a first housing, a display panel and an image capturing module is provided. The first housing has a first surface and a second surface opposite to the first surface. The display panel is disposed on the first surface. The image capturing module, which passes through the first surface and the second surface, includes a second housing and an image capturing unit. The image capturing unit is rotatably disposed on the display panel to be selectively positioned at a first position and a second position. When the image capturing unit rotates to the first position, a front surface of the image capturing unit is coplanar with the first surface. When the image capturing unit rotates to a second position, the front surface of the image capturing unit is coplanar with the display panel Other objects, features, and advantages of the invention will become apparent from the following detailed description of the preferred but non-limiting embodiments. The following description is made with reference to the accompanying drawings.

BRIEF DESCRIPTION OF THE DRAWINGS

FIG. 6B is a perspective diagram of an image capturing unit of the display of the preferred embodiment of the invention when rotated to a second position from the first position; and.

DETAILED DESCRIPTION OF THE INVENTION

The main concept of the invention is to provide a display having rotatable image capturing module whose design of protection housing prevents the module from being damaged due to tipping over or collision. The image capturing module includes a second housing and an image capturing unit. The second housing is mounted on a first housing of the display. The second housing has an opening. The two ends of the image capturing unit are respectively pivotally connected to the innerwall of the opening so that the image capturing unit is rotatably disposed in the display.

The embodiment of the invention provides a display having rotatable image capturing module whose two-stage positioning design enables the image capturing module to be fixed at several predetermined angles and positions for the user's convenience of use. The image capturing module of the invention is rotatably disposed on the display to be selectively positioned a first position and a second position. When the image capturing module is rotated to the first position, the front surface the image capturing module is coplanar with the first surface. When the image capturing module is rotated to a second position, the front surface of the image capturing module is coplanar with the display panel.

The invention is exemplified by a portable computer below. However, the present embodiment is merely an example of embodiment under the spirit of the invention and will not limit the scope of protection of the invention.

Figure 1A:
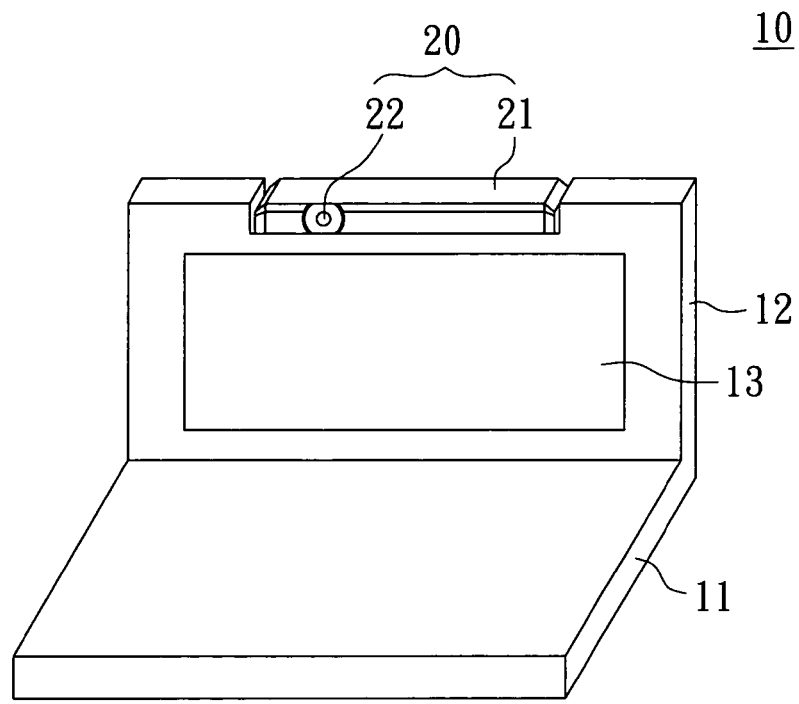
FIG. 1A(prior art) is a perspective diagram of a conventional portable computer with a lens module when unfolded.
Figure 1B:
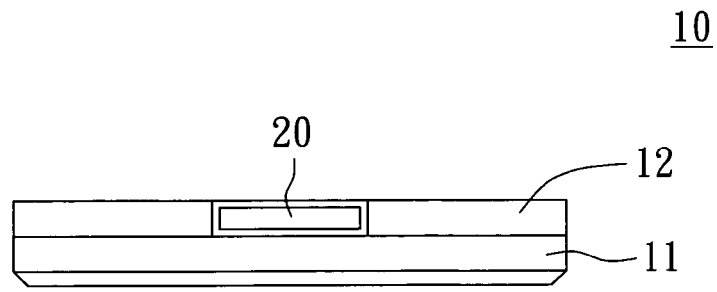
FIG. 1B(prior art) is a front view of the portable computer of FIG. 1A when folded.
Figure 2:
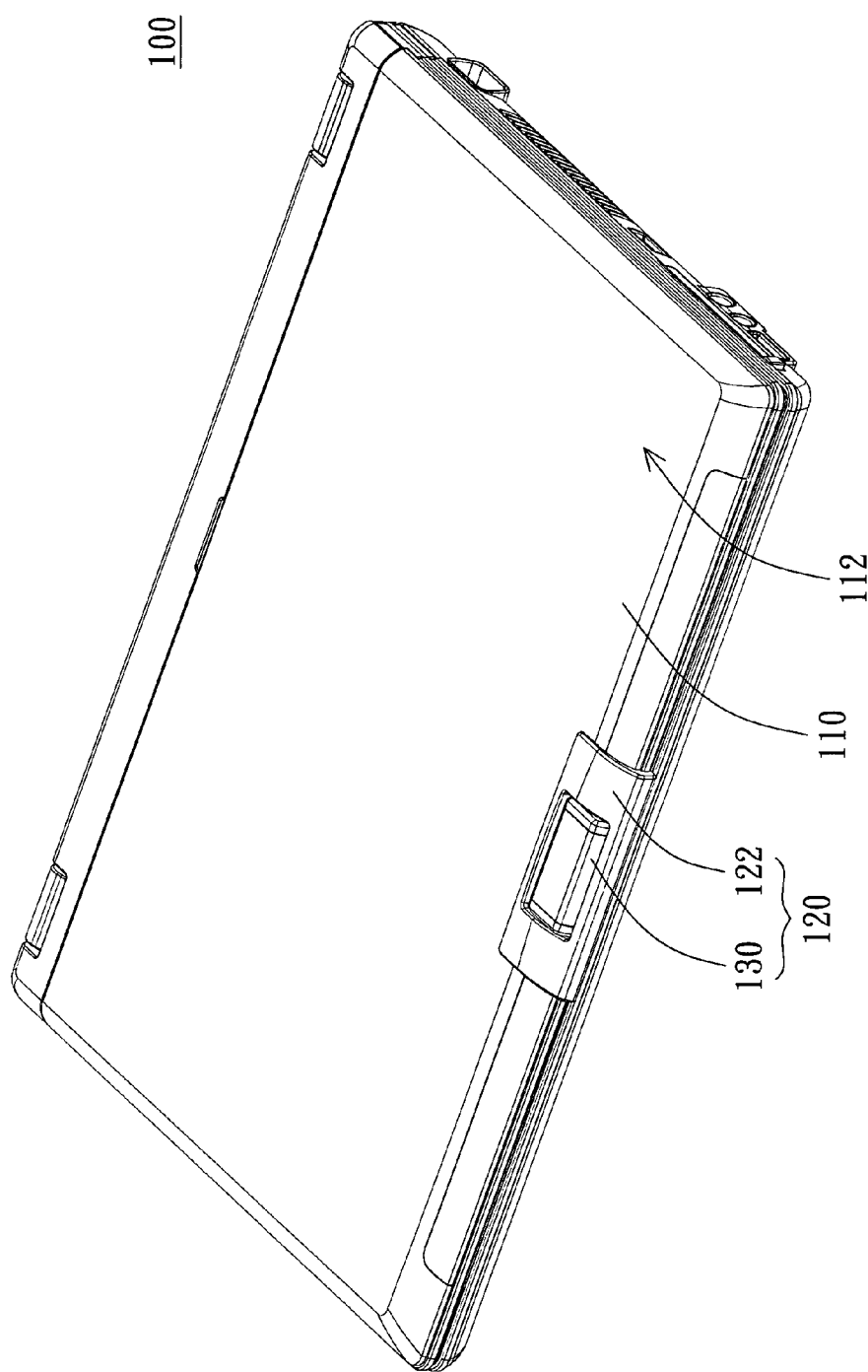
FIG. 2 is a perspective diagram of a portable computer with display according to a preferred embodiment of the invention.

Referring to FIG. 2, a perspective diagram of a portable computer with display according to a preferred embodiment of the invention is shown. The display of the present embodiment can be a liquid crystal display (LCD) panel disposed in a portable computer. The display 100 of the present embodiment includes a first housing 110, a display panel 114 (shown in FIG. 6A~6C) and an image capturing module 120. The first housing 110 has a first surface 111 (shown in FIG. 6A~6C) and a second surface 112 opposite to the first surface. The display panel is disposed on the first surface. The image capturing module 120 includes a second housing 122 and an image capturing unit 130. The second housing 122 is mounted on the first housing 110. Preferably, the second housing 122 protrudes from the edge of the first housing 110 and is higher than the first surface 111 (shown in FIG. 6A~6C), so that the user will not touch the image capturing unit incidentally when opening or closing the first housing, and that unnecessary rotations are avoided and the lifespan of the mechanical components are prolonged.

Figure 3A:
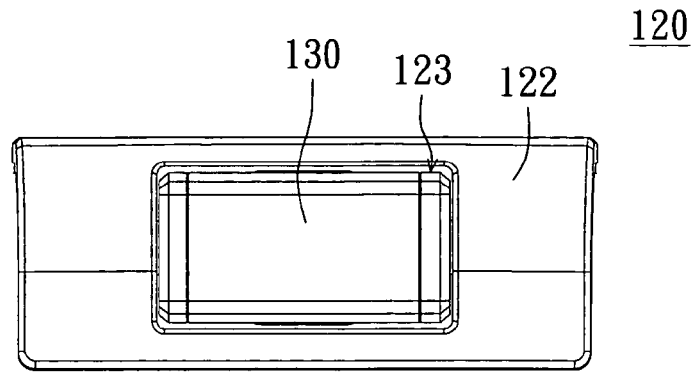
FIG. 3A is a top view of an image capturing module of a display according to the preferred embodiment of the invention.
Figure 3B:
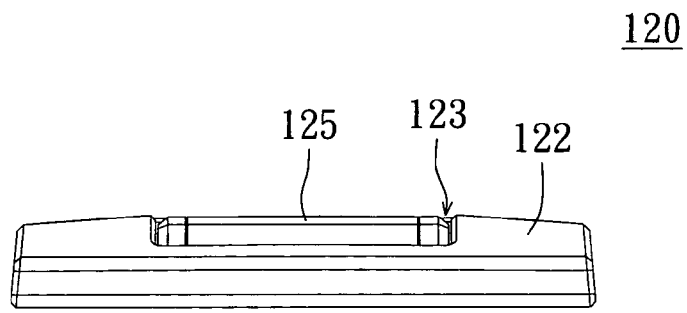
FIG. 3B is a side view of an image capturing module of a display according to the preferred embodiment of the invention.
Figure 3C:
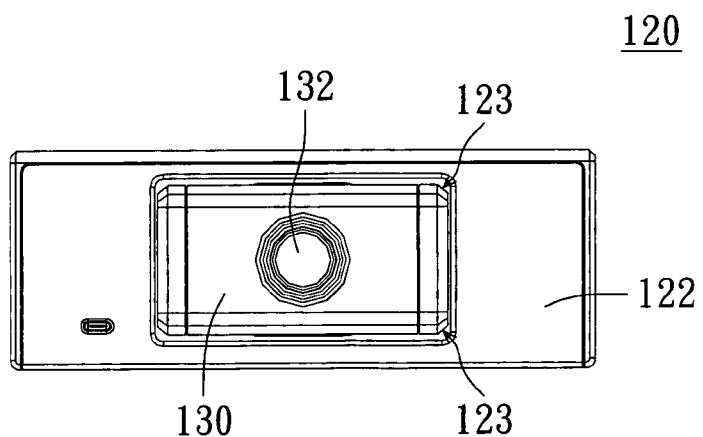
FIG. 3C is a bottom view of an image capturing module of a display according to the preferred embodiment of the invention.

Referring to FIG. 3A~3B. FIG. 3A is a top view of an image capturing module of a display according to the preferred embodiment of the invention. FIG. 3B a side view of an image capturing module of a display according to the preferred embodiment of the invention. FIG. 3C is a bottom view of an image capturing module of a display according to the preferred embodiment of the invention. In the image capturing module 120, the second housing 122 has an opening 123, passing through the first surface and the second surface (not shown in the diagram). The two ends of the image capturing unit 130 are respectively pivotally connected to the wall of the opening 123.

Figure 4:
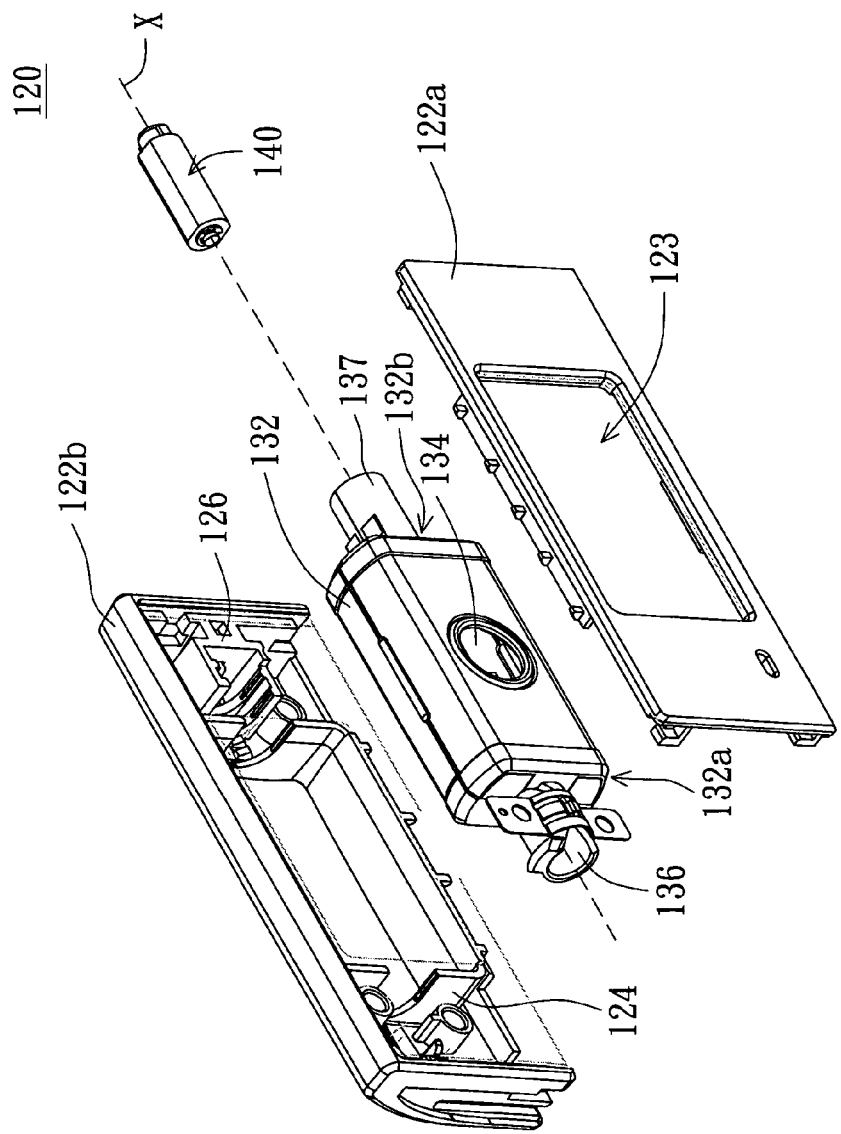
FIG. 4 is an exploded diagram of an image capturing module of a display according to the preferred embodiment of the invention.

Referring to FIG. 4, an exploded diagram of an image capturing module of a display according to the preferred embodiment of the invention is shown. The second housing 122 has an upper cover 122a and a lower cover 122b. The two covers 122a and 122b sharing the opening 123. The upper cover 122a and the lower cover 122b form an accommodation space. The second housing 122 includes a chassis 124 and a fixing base 126.

The image capturing unit 130 includes a third housing 132, a lens 134, a pivot 136, and a multi-stage rotary assembly 140. The third housing 132 has a first side 132a and a second side 132b. The lens 134 is disposed on the third housing 132. The pivot 136 protrudes from a first side 132a of the third housing 132 and is rotatably engaged with the chassis 124, so that the third housing 132 and the lens 134 are rotated relatively to the second housing 122 and rotated around the pivot 136 and its center line as a rotation axis X. By rotating the image capturing unit to different positions, images of different angles can be fetched.

As shown in FIG. 4, the multi-stage rotary assembly 140 is rotatably disposed on the second side 132b of the third housing 132. For example, the multi-stage rotary assembly 140 can be rotate around the rotation axis X to be disposed on the hollowed spindle 137. The hollowed spindle 137 is mounted on the second side 132b of the third housing 132.

Figure 5A:
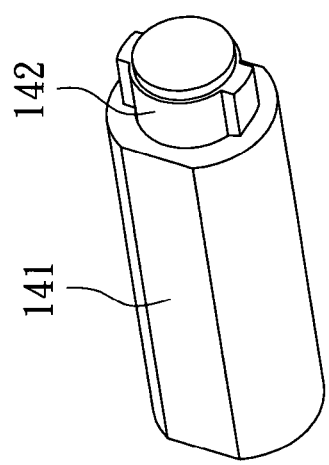
FIG. 5A is a perspective diagram of a multi-stage rotary assembly of the image capturing module of FIG. 4.
Figure 5B:
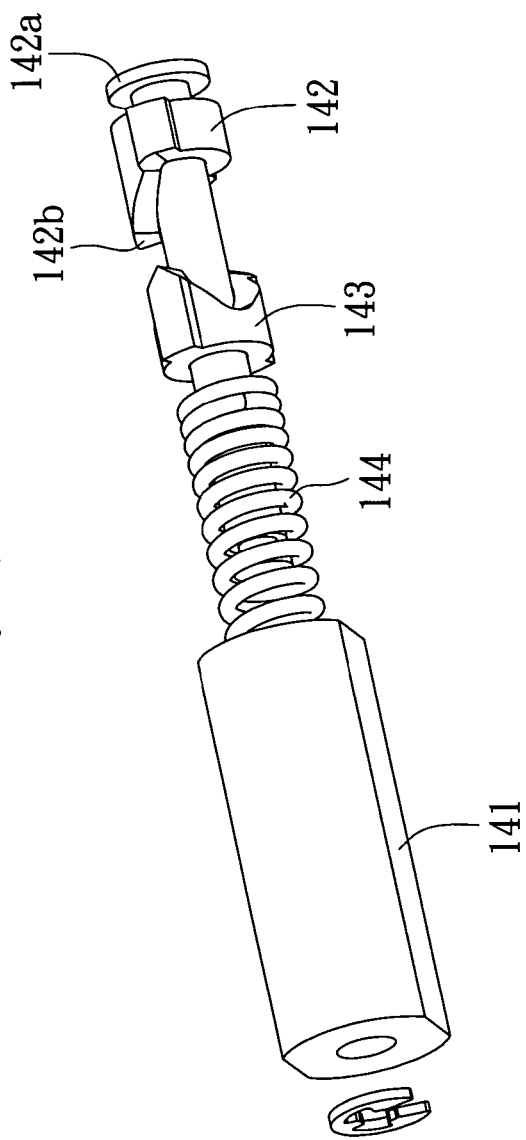
FIG. 5B is an exploded diagram of a multi-stage rotary assembly of the image capturing module of FIG. 5A.

FIG. 5A is a perspective diagram of a multi-stage rotary assembly of the image capturing module of FIG. 4. FIG. 5B is an exploded diagram of a multi-stage rotary assembly of the image capturing module of FIG. 5A. Referring to both FIG. 5A and FIG. 5B, the sleeve 141 is mounted on the second side 132b of the third housing. The sleeve 141 and the pivot 136 are respectively positioned on the two sides of the third housing 132 to be used as a rotation axis (shown in FIG. 4). The one end 142a of the engaging piece 142 is engaged with the fixing base (labeled 126 in FIG. 4), and another end 142b engaging piece 142 is received in the sleeve 141. The cam 143 is fixed in the sleeve 141 and is opposite to the engaging piece 142. The cam 143 is complementary with the engaging piece 142 to be selectively engaged with the engaging piece 142. The elastomer, such as a spring 144 or an elastic piece for instance, is disposed around the cam 143 and positioned in the sleeve 141.

Figure 6A:
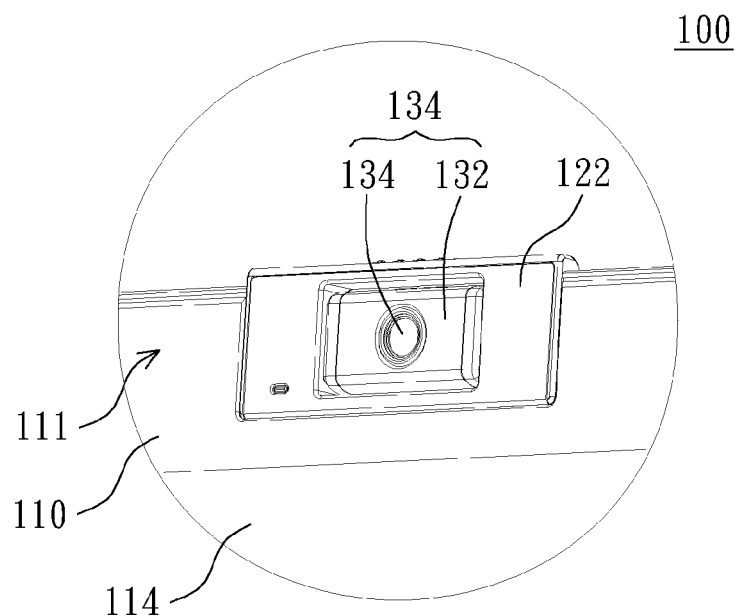
FIG. 6A is a perspective diagram of an image capturing unit of the display of the present embodiment when at a first position.
Figure 6B:
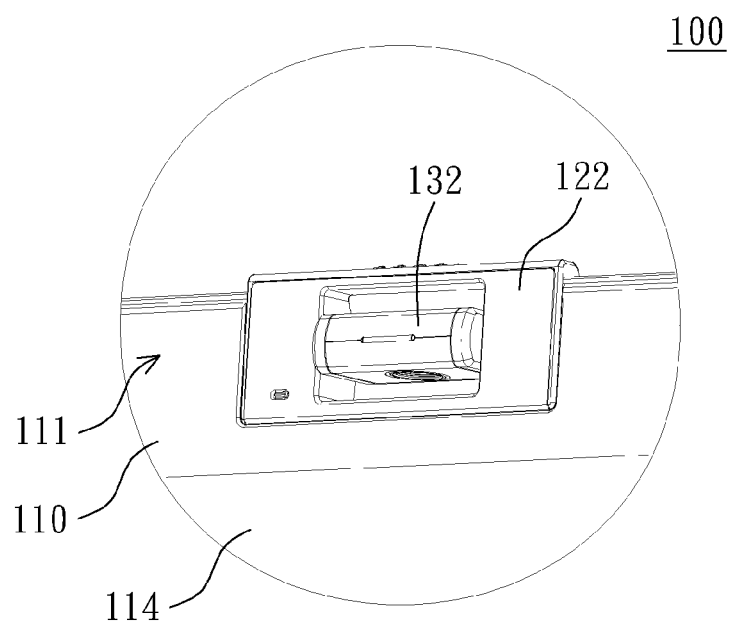
Figure 6C:
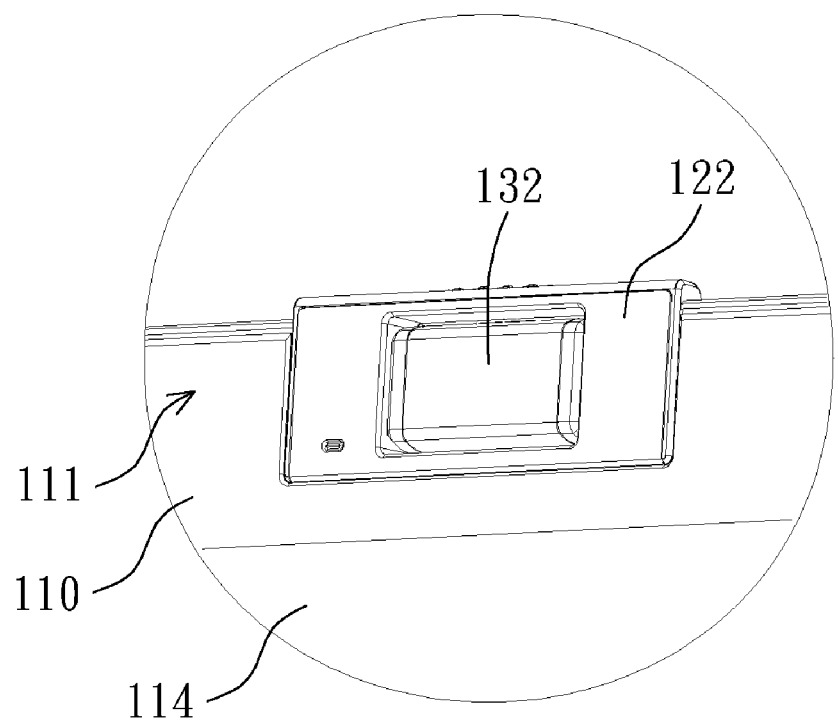
FIG. 6C is a perspective diagram of image capturing unit of the display of the preferred embodiment of the invention when at a second position.

Referring to both FIGS. 5B and 6A, FIG. 6A is a perspective diagram of an image capturing unit of the display of the present embodiment when at a first position. When the third housing 132 is rotated, the sleeve 141 moves the cam 143 to rotate along the rotation n axis X to the first position, and the cam 143 is engaged with the engaging piece 142 so that the lens 134 is coplanar with the first surface. Referring to both FIGS. 5B and 6B, FIG. 6B is a perspective diagram of an image capturing unit of the display of the preferred embodiment of the invention when rotated to a second position from the first position. When the third housing 132 drives the cam 143 to rotate and depart from the first position, a gap is generated between the cam 143 and the engaging piece 142 so as to compress the elastomer 144, meanwhile the cam 143 is urged to be rotated towards a second position by the compressed elastomer 144. Referring to both FIGS. 5B and 6C, FIG. 6C is a perspective diagram of image capturing unit of the display of the preferred embodiment of the invention when at a second position. When the third housing 132 drives the cam 143 to be rotated along the rotation axis X to the second position, the cam 143 is engaged with the engaging piece 142 again so that the lens 134 is coplanar with the second surface 112. Thus, the image capturing unit can be positioned at the most commonly used positions: the first position and the second position. Such two-stage positioning design enables the image capturing module to be fixed at several predetermined angles and positions for the user's convenience of use.

The display and the image capturing module thereof disclosed in the above embodiment of the invention has a protection housing to prevent the image capturing unit from unnecessary tipping over and collision when the display is opened or closed. Besides, the two-stage positioning design enables the image capturing module to be fixed at several predetermined angles and positions for the user's convenience of use.

While the invention has been described by way of example and in terms of a preferred embodiment, it is understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A display, comprising:
   a first housing having a first surface and a second surface opposite to the first surface;
   a display panel embedded on the first surface; and
   an image capturing module, comprising:
      a second housing mounted on and fixed to the first housing, wherein the second housing has an opening, which passes through the first housing; and
      an image capturing unit pivotally connected to an inner wall of the opening so that the image capturing unit rotates relatively to the second housing around a rotation axis, which is perpendicular to the normal vector of the first surface.

2. The display according to claim 1, wherein the second housing comprises a chassis, and the image capturing unit comprises:
   a third housing;
   a lens disposed in the third housing; and
   a pivot protruding from a first side of the third housing and rotatably engaging with the chassis so that the third housing and the lens are rotated relatively to the second housing and rotated around on the pivot with its center line as a rotation axis.

3. The display according to claim 2, wherein the second housing further comprises a base, and the image capturing unit further comprises:
   a sleeve mounted on a second side of the third housing, the sleeve and the pivot respectively positioned on the two sides of the third housing to be used as the rotation axis;
   an engaging piece, whose one end is engaged with the fixing base and another end is received in the sleeve;
   a cam fixed in the sleeve and opposite to the engaging piece, wherein the cam is complementary to the engaging piece and used for being selectively engaged with the engaging piece; and
   an elastomer disposed around the cam and positioned in the sleeve;
   wherein when the third housing is rotated and the sleeve moves the cam to rotate around the rotation axis to a first position, the cam is engaged with the engaging piece, and the lens is substantially coplanar with the first surface;
   wherein when the third housing is rotated and the sleeve moves the cam to rotate and depart from the first position, the cam pushes the engaging piece so as to compress the elastomer, the compressed elastomer provides an elastic force to urge the cam to rotate towards a second position;
   wherein when the third housing is rotated and the sleeve moves the cam to rotate around the rotation axis to the second position, the cam is engaged with the engaging piece, and the lens is substantially coplanar with the second surface.

4. The display according to claim 3, wherein the elastomer is a spring or an elastic piece.

5. The display according to claim 1, wherein the second housing comprises an upper cover and a lower cover, the upper cover and the lower cover form an accommodation space used for receiving a fixing base, a chassis, a pivot and a cam.

6. The display according to claim 1, wherein the second housing protrudes from an edge of the first housing and is higher than the first surface.

7. The display according to claim 1, wherein the display panel is a display panel of a portable computer.

8. A display, comprising:
   a first housing having a first surface and a second surface opposite to the first surface;
   a display panel embedded on the first surface; and
   an image capturing module passes through the first housing, the image capturing module comprising:
      an image capturing unit rotatably disposed on the display and selectively positioned at a first position and a second position, the image capturing unit comprising an elastomer;
      wherein when the image capturing unit is rotated and departs from the first position, the elastomer provides an elastic force to rotate the image capturing unit towards a second position;
      wherein a front surface of the image capturing unit is coplanar with the first surface when the image capturing unit is rotated to the first position, and the front surface of the image capturing unit is coplanar with the second surface when the image capturing unit is rotated to the second position.

9. The display according to claim 8, wherein the image capturing module comprises:
   a second housing fixed on the first housing, wherein the second housing has an opening, which passes through the first surface and the second surface;
   the image capturing unit positioned in the opening, two ends of the image capturing unit respectively pivotally connected to an inner wall of the opening so that the image capturing unit is rotatably disposed on the second housing.

10. The display according to claim 9, wherein the second housing comprises a chassis and a fixing base, and the image capturing unit comprises:
    a third housing having a first side and a second side opposite to the first side;
    a lens disposed on the third housing and positioned on the front surface of the image capturing module;
    a pivot protruding from the first side of the third housing and rotatably engaged with the chassis so that the third housing and the lens are rotated around the pivot as a rotation axis and rotated relatively to the second housing;
    a sleeve mounted on the second side of the third housing, the sleeve and the pivot respectively positioned on the two sides of the third housing to be used as the rotation axis;
    an engaging piece, whose one end is engaged with the fixing base and another end is received in the sleeve;
    a cam fixed in the sleeve and opposite to the engaging piece, wherein the cam is complementary to the engaging piece and used for being selectively engaged with the engaging piece; and
    an elastomer disposed around the cam and positioned in the sleeve;
    wherein when the third housing is rotated and the sleeve moves the cam to rotate around the rotation axis to a first position, the cam is engaged with the engaging piece, and the lens is substantially coplanar with the first surface;
    wherein when the third housing is rotated and the sleeve moves the cam to rotate and depart from the first position, the cam pushes the engaging piece so as to compress the elastomer, the compressed elastomer provides an elastic force to urge the cam to rotate towards a second position;

wherein when the third housing is rotated and the sleeve moves the cam to rotate around the rotation axis to the second position, the cam is engaged with the engaging piece so that the lens is substantially coplanar with the second surface.

11. The display according to claim 10, wherein the elastomer is a spring or an elastic piece.

12. The display according to claim 8, a second housing fixed on the first housing, wherein the second housing, comprises an upper cover and a lower cover, the upper cover and the lower cover form an accommodation space used for receiving a fixing base, a chassis, a pivot and a cam.

13. The display according to claim 8, wherein a second housing protrudes from an edge of the first housing and is higher than the first surface.

14. The display according to claim 8, wherein the display panel is a display panel of a portable computer.

15. An image capturing module disposed in a display comprising a display panel and a first housing, the first housing having a first surface and a second surface opposite to the first surface, the display panel disposed on the first surface, the image capturing module comprising:

a second housing having an opening, which passes through the first housing, wherein the second housing is mounted on and fixed to the first housing; and an image capturing unit, comprising:
 a third housing;
 a lens disposed on the third housing; and
 a pivot protruding from a first side of the third housing and rotatably engaged with the second housing so that the third housing and the lens are rotated around the pivot as a rotation axis, which is perpendicular to the normal vector of the first surface, and rotated relatively to the second housing.

16. The image capturing module according to claim 15, wherein the second housing further comprises a chassis opposite to the first side of the third housing to receive the pivot.

17. The image capturing module according to claim 15, wherein the second housing further comprises a fixing base, and the image capturing unit further comprises:

a sleeve mounted on a second side of the third housing, the sleeve and the pivot respectively positioned on the two sides of the third housing to be used as the rotation axis;

an engaging piece, whose one end is engaged with the fixing base and another end is received in the sleeve;

a cam fixed in the sleeve and opposite to the engaging piece, wherein the cam is complementary to the engaging piece and used for being selectively engaged with the engaging piece; and an elastomer disposed around the cam and positioned in the sleeve;

wherein when the third housing is rotated and the sleeve moves the cam to rotate around the rotation axis to a first position, the cam is engaged with the engaging piece, and the lens is substantially coplanar with the first surface;

wherein when the third housing is rotated and the sleeve moves the cam to rotate and depart from the first position, the cam pushes the engaging piece so as to compress the elastomer, the compressed elastomer provides an elastic force to urge the cam to rotated towards a second position;

wherein when the third housing is rotated and the sleeve moves the cam to rotated around the rotation axis to the second position, the cam is engaged with the engaging piece, and the lens is substantially coplanar with the second surface.

18. The image capturing module according to claim 17, wherein the elastomer is a spring or an elastic piece.

19. The image capturing module according to claim 15, wherein the second housing comprises an upper cover and a lower cover, the upper cover and the lower cover forms an accommodation space used for receiving a fixing base, a chassis, the pivot and a cam.

20. The image capturing module according to claim 15, wherein the second housing protrudes from an edge of the first housing and is higher than the first surface.

21. The image capturing module according to claim 15, wherein the display panel is a display panel of a portable computer.

* * * * *